United States Patent
Helfinstine et al.

(10) Patent No.: US 7,541,304 B2
(45) Date of Patent: *Jun. 2, 2009

(54) SAG CONTROL OF ISOPIPES USED IN MAKING SHEET GLASS BY THE FUSION PROCESS

(75) Inventors: John D. Helfinstine, Big Flats, NY (US); Daniel J. Liebner, Corning, NY (US); John L. Martin, Weston, WV (US); Dean V. Neubauer, Horseheads, NY (US); William R. Powell, Horseheads, NY (US)

(73) Assignee: Corning Incorporated, Corning, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 12/069,055

(22) Filed: Feb. 6, 2008

(65) Prior Publication Data

US 2008/0139377 A1 Jun. 12, 2008

Related U.S. Application Data

(63) Continuation of application No. 11/705,314, filed on Feb. 12, 2007, now Pat. No. 7,414,001, which is a continuation of application No. 11/294,315, filed on Dec. 5, 2005, now Pat. No. 7,259,119, which is a continuation of application No. 10/449,701, filed on May 29, 2003, now Pat. No. 6,974,786, which is a continuation of application No. PCT/US01/45300, filed on Nov. 30, 2001.

(51) Int. Cl.
   *C04B 35/48* (2006.01)
   *C03B 17/06* (2006.01)
(52) U.S. Cl. ............... 501/106; 65/374.13; 65/195

(58) Field of Classification Search ............. 501/106; 65/374.13, 195
See application file for complete search history.

(56) References Cited

U.S. PATENT DOCUMENTS 2,746,874 A    5/1956   Wittemore, Jr. ............... 106/57

(Continued)

FOREIGN PATENT DOCUMENTS

JP    2966207    8/1999

(Continued)

OTHER PUBLICATIONS

Kingery et al., "Plastic Deformation, Viscous Flow, and Creep", *Introduction to Ceramics*, 2nd Edition, John Wiley & Sons, New York, 1976, pp. 704-767.

(Continued)

*Primary Examiner*—Karl E Group
(74) *Attorney, Agent, or Firm*—Maurice M. Klee

(57) ABSTRACT

Isopipes for use in making sheet glass by a fusion process are provided which exhibit reduced sag. The isopipes are composed of a zircon refractory which has a mean creep rate (MCR) at 1180° C. and 250 psi and a 95 percent confidence band (CB) for said mean creep rate such that the CB to MCR ratio is less than 0.5, the MCR and the CB both being determined using a power law model. The zircon refractory can contain titania ($TiO_2$) at a concentration greater than 0.2 wt. % and less than 0.4 wt. %. A concentration of titania in this range causes the zircon refractory to exhibit a lower mean creep rate than zircon refractories previously used to make isopipes. In addition, the variation in mean creep rate is also reduced which reduces the chances that the zircon refractory of a particular isopipe will have an abnormally high creep rate and thus exhibit unacceptable sag prematurely.

10 Claims, 5 Drawing Sheets

U.S. PATENT DOCUMENTS

| | | | | |
|---|---|---|---|---|
| 2,752,259 | A | 6/1956 | Cook | 106/57 |
| 3,285,757 | A | 11/1966 | Cornely | 106/57 |
| 3,338,696 | A | 8/1967 | Dockerty | 65/145 |
| 3,347,687 | A | 10/1967 | Henry | 106/57 |
| 3,437,470 | A | 4/1969 | Overman | 65/195 |
| 3,682,609 | A | 8/1972 | Dockerty | 65/83 |
| 5,023,218 | A | 6/1991 | Zanoli et al. | |
| 5,116,789 | A | 5/1992 | Dumbaugh, Jr. et al. | |
| 5,124,287 | A | 6/1992 | Wehrenberg et al. | 501/106 |
| 5,407,873 | A | 4/1995 | Goerenz et al. | 501/106 |
| 5,466,643 | A | 11/1995 | Ishino et al. | |
| 6,121,177 | A | 9/2000 | Guigonis et al. | 501/105 |
| 6,974,786 | B2 * | 12/2005 | Helfinstine et al. | 501/106 |
| 7,238,635 | B2 * | 7/2007 | Ames et al. | 501/106 |
| 7,259,119 | B2 * | 8/2007 | Helfinstine et al. | 501/106 |
| 2005/0130830 | A1 | 6/2005 | Ames et al. | 501/103 |
| 2006/0094585 | A1 | 5/2006 | Helfinstine et al. | 501/106 |

FOREIGN PATENT DOCUMENTS

JP    3007684    11/1999

OTHER PUBLICATIONS

"Flat Glass", *Fundamentals of Inorganic Glasses*, Academic Press, Inc., Boston, 1994, Chapter 20, Section 4.2, pp. 534-540.
Draper et al., *Applied Regression Analysis*, "Two Predictor Variables", Chapter 4, John Wiley & Sons, New York, 1981, pp. 193-212.
US 7,354,878, 04/2008, Helfinstine et al. (withdrawn)*

* cited by examiner

SAG CONTROL OF ISOPIPES USED IN MAKING SHEET GLASS BY THE FUSION PROCESS

CROSS REFERENCE TO RELATED APPLICATIONS

This application is a continuation of U.S. application Ser. No. 11/705,314, filed on Feb. 12, 2007, now U.S. Pat. No. 7,414,001, which is a continuation of U.S. application Ser. No. 11/294,315, filed on Dec. 5, 2005, now U.S. Pat. No. 7,259,119, which is a continuation of U.S. application Ser. No. 10/449,701, filed on May 29, 2003, now U.S. Pat. No. 6,974,786, the contents of which are incorporated herein by reference, which is a continuation of International Application No. PCT/US01/45300, filed on Nov. 30, 2001, which was published in English under PCT Article 21(2) on Jun. 6, 2002 as International Publication No. WO 02/44102. This application claims the benefit under 35 USC §119(e) of U.S. Provisional Application No. 60/250,921, filed on Dec. 1, 2000.

NAMES OF PARTIES TO A JOINT RESEARCH AGREEMENT (35 USC §103(c)(2)(C))

This application is the result of a joint research agreement between Corning Incorporated and Corhart Refractories Corporation (now a part of Saint-Gobain Plastics and Ceramics, Inc.).

FIELD OF THE INVENTION

This invention relates to isopipes used in the production of sheet glass by the fusion process and, in particular, to techniques for controlling the sag which such isopipes exhibit during use.

BACKGROUND OF THE INVENTION

A. The Fusion Process

The fusion process is one of the basic techniques used in the glass making art to produce sheet glass. See, for example, Varshneya, Arun K., "Flat Glass," *Fundamentals of Inorganic Glasses*, Academic Press, Inc., Boston, 1994, Chapter 20, Section 4.2., 534-540. Compared to other processes known in the art, e.g., the float and slot draw processes, the fusion process produces glass sheets whose surfaces have superior flatness and smoothness. As a result, the fusion process has become of particular importance in the production of the glass substrates used in the manufacture of liquid crystal displays (LCDs).

The fusion process, specifically, the overflow downdraw fusion process, is the subject of commonly assigned U.S. Pat. Nos. 3,338,696 and 3,682,609, to Stuart M. Dockerty, the contents of which are incorporated herein by reference. A schematic drawing of the process of these patents is shown In FIG. 1. As illustrated therein, the system includes a supply pipe 9 which provides molten glass to a collection trough 11 formed in a refractory body 13 known as an "isopipe."

Once steady state operation has been achieved, molten glass passes from the supply pipe to the trough and then overflows the top of the trough on both sides, thus forming two sheets of glass that flow downward and then inward along the outer surfaces of the isopipe. The two sheets meet at the bottom or root 15 of the isopipe, where they fuse together into a single sheet. The single sheet is then fed to drawing equipment (represented schematically by arrows 17), which controls the thickness of the sheet by the rate at which the sheet is drawn away from the root. The drawing equipment is located well downstream of the root so that the single sheet has cooled and become rigid before coming into contact with the equipment.

As can be seen in FIG. 1, the outer surfaces of the final glass sheet do not contact any part of the outside surface of the isopipe during any part of the process. Rather, these surfaces only see the ambient atmosphere. The inner surfaces of the two half sheets which form the final sheet do contact the isopipe, but those inner surfaces fuse together at the root of the isopipe and are thus buried in the body of the final sheet. In this way, the superior properties of the outer surfaces of the final sheet are achieved.

As is evident from the foregoing, isopipe 13 is critical to the success of the fusion process. In particular, the dimensional stability of the isopipe is of great importance since changes in isopipe geometry affect the overall success of the process. See, for example, Overman, U.S. Pat. No. 3,437,470, and Japanese Patent Publication No. 11-246230.

Significantly, the conditions under which the isopipe is used make it susceptible to dimensional changes. Thus, the isopipe must operate at elevated temperatures on the order of 1000° C. and above. Moreover, in the case of the overflow downdraw fusion process, the isopipe must operate at these elevated temperatures while supporting its own weight as well as the weight of the molten glass overflowing its sides and in trough 11, and at least some tensional force that is transferred back to the isopipe through the fused glass as it is being drawn. Depending on the width of the glass sheets that are to be produced, the isopipe can have an unsupported length of 1.5 meters or more.

To withstand these demanding conditions, isopipes 13 have been manufactured from isostatically pressed blocks of refractory material (hence the name "iso-pipe"). In particular, isostatically pressed zircon refractories have been used to form isopipes for the fusion process. As known in the art, zircon refractories are materials composed primarily of $ZrO_2$ and $SiO_2$, e.g., in such materials, $ZrO_2$ and $SiO_2$ together comprise at least 95 wt. % of the material, with the theoretical composition of the material being $ZrO_2.SiO_2$ or, equivalently, $ZrSiO_4$. Even with such high performance materials, in practice, isopipes exhibit dimensional changes which limit their useful life. In particular, isopipes exhibit sag such that the middle of the unsupported length of the pipe drops below its outer supported ends. The present invention is concerned with controlling such sag.

A primary contributor to the sag of an isopipe is the creep rate $\epsilon = d\epsilon/dt$ of the material from which it is made. As known in the art, for many materials, creep rate as a function of applied stress $\sigma$ can be modeled by a power law expression of the following form:

$$\epsilon = A\sigma^n \exp(Q/T) \qquad (1)$$

where T is temperature and A, n, and Q are material dependent constants. See Kingery et al., "Plastic Deformation, Viscous Flow, and Creep," *Introduction to Ceramics, $2^{nd}$* edition, John Wiley & Sons, New York, 1976, 704-767 and, in particular, equation 14.9. Being the time derivative of strain, the units of creep rate are length/length/time. Because in equation (1) creep rate varies as stress raised to a power, i.e., $\sigma^n$, the use of equation (1) will be referred to herein as the "power law model."

Lowering the creep rate of the material used to make an isopipe results in less sag during use. As discussed in detail below, in accordance with certain aspects of the invention it has been found that the sag of an isopipe can be reduced by forming the isopipe from an isostatically pressed zircon refractory having a titania ($TiO_2$) content which is greater than 0.2 wt. % and less than 0.4 wt. %, e.g., a $TiO_2$ content of approximately 0.3 wt. %. In particular, it has been found that such a zircon refractory exhibits a lower mean creep rate than zircon refractories used in the past to from isopipes and having a titania content of about 0.1 wt. %.

In addition, it has also been found that controlling the titania content of a zircon refractory to be within the above range significantly enhances the usefulness of the power law model of equation (1) in modeling the sag of isopipes during use. This enhanced usefulness results from improved 95% confidence intervals for the mean creep rates predicted by the model when equation (1) is evaluated for a particular set of $\sigma, T$ values. Such improved 95% confidence intervals, in turn, mean that the sag which an isopipe will exhibit during use can be more accurately modeled using, for example, a finite element or other modeling technique. More accurate modeling greatly enhances the ability to develop improved isopipe designs since numerous designs can be evaluated theoretically with only the best candidates being selected for actual construction and testing.

B. Zircon Refractories

As indicated above, the present invention relates to isopipes composed of a zircon refractory having a titania concentration within specified limits. Corhart Refractories Corporation (Louisville, Ky.) offers a number of zircon refractories containing varying amounts of $TiO_2$. For example, Corhart's ZS-835 product is specified to contain 0.2 wt. % $TiO_2$, its ZS-835HD product 0.4 wt. %, its Zircon 20 product 0.7 wt. %, and its ZS-1300 product 1.2 wt. %.

As a raw material, zircon can have varying amounts of titania. For example, U.S. Pat. No. 2,752,259 reports that the zircon used in its examples had 0.34 wt. % $TiO_2$, while the zircon used in U.S. Pat. No. 3,285,757 had 0.29 wt. % $TiO_2$. U.S. Pat. Nos. 3,347,687 and 3,359,124 each describe zircons having $TiO_2$ concentrations of 0.2 wt. %. In addition to being naturally present in zircon as a raw material, $TiO_2$ can also be a component of clays used in producing zircon refractories. See U.S. Pat. Nos. 2,746,874 and 3,359,124.

Other discussions of the use of titania in zircon products can be found in Goerenz et al., U.S. Pat. No. 5,407,873 which discloses (1) the use of phosphorus compounds to improve the corrosion resistance of zirconium silicate bricks and (2) the use of titanium dioxide as a sintering aid in the manufacture of such bricks. Although the patent states that sintering can be improved by adding between 0.1 wt. % and 5 wt. % of titanium dioxide, all of the examples of the patent use more than 1 wt. % of titanium dioxide and the patent's preferred composition consists of 98 wt. % zirconium silicate, 1.5 wt. % titanium dioxide, and 0.5 wt. % of a phosphorous compound.

Wehrenberg et al., U.S. Pat. No. 5,124,287 relates to the use of zirconia in particle form to improve the thermal shock resistance of zircon refractories. Titania is employed to enhance grain growth during sintering. The patent claims titania concentrations between 0.1 wt. % and 4 wt. %. The preferred titania concentration is 1 wt. %, and when blistering is a problem, only 0.1 wt. % titania is used. The patent states that "grog" having a titania concentration of 0.2 wt. % was used as a starting material for some of its examples.

Significantly, none of the foregoing disclosures regarding the use of titania in zircons relates to employing titania concentration as a means to control the creep rate of a zircon refractory, or to enhance the ability of a power law model to represent the material, or to achieve the ultimate goal of reducing the sag of an isopipe made of a zircon refractory.

SUMMARY OF THE INVENTION

In view of the foregoing, it is an object of this invention to provide improved isopipes for use in the fusion process. More particularly, it is an object of the invention to provide isopipes that exhibit less sag than existing isopipes.

To achieve the foregoing and other objects, the invention in accordance with a first aspect provides isopipes which comprise a zircon refractory that exhibits a lower creep rate than the zircon refractories previously used to produce isopipes.

In accordance with a second aspect, the invention provides isopipes which comprise a zircon refractory that in comparison to zircon refractories previously used to produce isopipes, has a creep rate that can be modeled more accurately by a power law model.

In accordance with a third aspect, the invention provides isopipes comprising a body having a configuration adapted for use in a fusion process, said body comprising a zircon refractory which purposely comprises $TiO_2$ at a concentration greater than 0.2 wt. % and less than 0.4 wt. %, preferably greater than 0.25 wt. % and less than 0.35 wt. %, and most preferably about 0.3 wt. %.

In accordance with a fourth aspect, the invention provides isopipes comprising a body having a configuration adapted for use in a fusion process, said body comprising a zircon refractory which has a mean creep rate (MCR) at 1180° C. and 250 psi of less than $0.7 \times 10^{-6}$ inches/inches/hour, preferably less than $0.6 \times 10^{-6}$ inches/inches/hour, and most preferably less than $0.5 \times 10^{-6}$ inches/inches/hour, where the MCR is determined using a power law model, i.e., a power law model fit to experimental data.

In accordance with this fourth aspect, the zircon refractory also preferably has a MCR at 1180° C. and 1000 psi of less than $5 \times 10^{-6}$ inches/inches/hour and more preferably less than $3 \times 10^{-6}$ inches/inches/hour, where again the MCR is determined using a power law model.

In accordance with a fifth aspect, the invention provides isopipes comprising a body having a configuration adapted for use in a fusion process, said body comprising a zircon refractory which has a MCR at 1180° C. and 250 psi and a 95 percent confidence band (CB) for said MCR such that the CB to MCR ratio is less than 0.5, the MCR and the CB both being determined using a power law model. In accordance with these aspects of the invention, the CB to MCR ratio at 1180° C. and 1000 psi is also preferably less than 0.5, where again the MCR and the CB values used to calculate the CB to MCR ratio at said temperature and stress level are determined using a power law model.

In accordance with a sixth aspect, the invention provides a method for reducing the sag of an isopipe used in a fusion process that produces glass sheets comprising forming said isopipe from a zircon refractory which purposely comprises $TiO_2$ at a concentration greater than 0.2 wt. % and less than 0.4 wt. %, preferably greater than 0.25 wt. % and less than 0.35 wt. %, and most preferably about 0.3 wt. %.

The above first through sixth aspects of the invention can be used separately or in all possible combinations. For example, the compositional limitations of the third and sixth aspects of the invention (including the base, preferred, and most preferred values of those limitations) can be combined with the mean creep rate limitations of the fourth aspect of the invention (including the base, preferred, and most preferred values of those limitations) and/or with the CB to MCR ratio limitations of the fifth aspect of the invention (including the base and preferred pressure values of those limitations). Similarly, the mean creep rate limitations of the fourth aspect of the invention (including the base, preferred, and most preferred values of those limitations) can be combined with CB to MCR ratio limitations of the fifth aspect of the invention (including the base and preferred pressure values of those limitations).

As used in this specification and in the claims, the term "isopipe" means any sheet forming delivery system used in a fusion process which produces flat glass wherein at least a part of the delivery system comes into contact with the glass just prior to fusion, irrespective of the configuration or the number of components making up the delivery system. Also, the MCR and CB values are determined using standard statistical techniques for calculating such values from the fit of an equation such as the power law model to measured data. See, for example, Draper et al., *Applied Regression Analysis*, John Wiley & Sons, New York, 1981, 193-212.

Further, the word "purposely" when used in connection with $TiO_2$ concentrations means that the $TiO_2$ concentration is intentionally selected to control isopipe sag and is not merely a $TiO_2$ concentration which one or more zircons (including zircons for making isopipes) may have had as a result of compositional variations without being the result of a conscious intention to control isopipe sag and/or to improve the ability of a power law model to represent the creep rate of zircon used in an isopipe.

Additional features and advantages of the invention will be set forth in the detailed description which follows, and in part will be readily apparent to those skilled in the art from that description or recognized by practicing the invention as described herein. It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various aspects of the invention, and together with the description serve to explain the principles and operation of the invention.

DETAILED DESCRIPTION OF THE INVENTION

Figure 1:
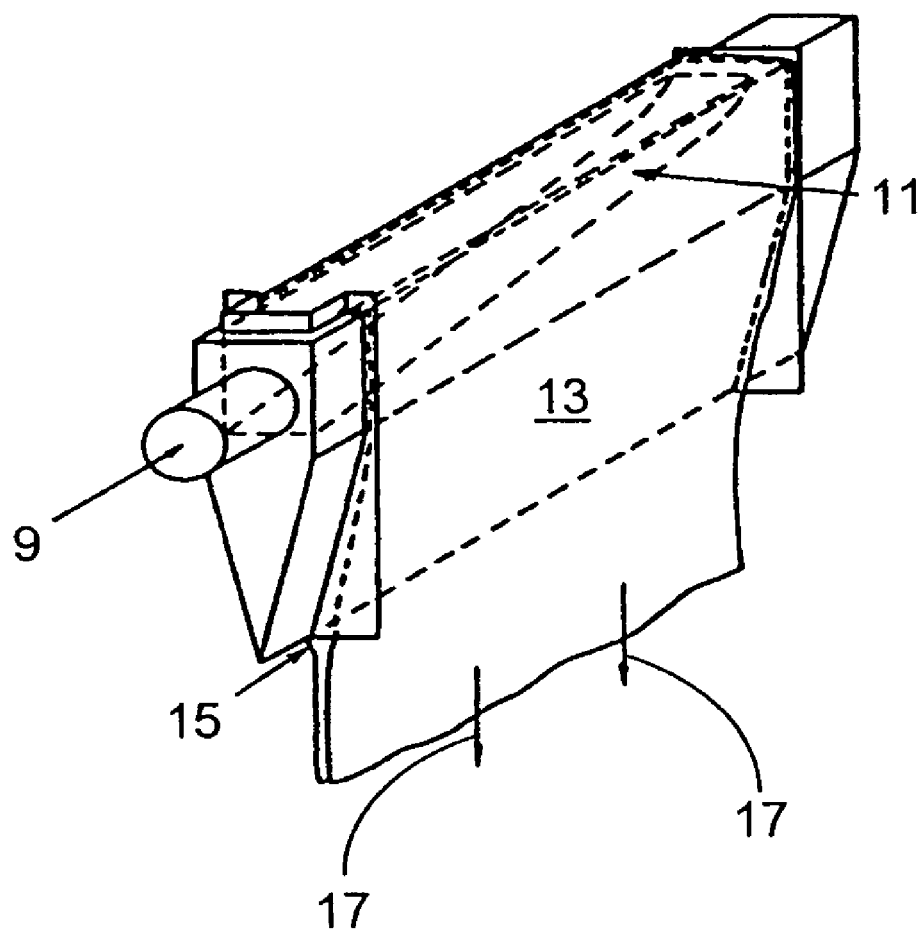
FIG. 1 is a schematic drawing illustrating a representative construction for an isopipe for use in an overflow downdraw fusion process for making flat glass sheets.

As discussed above, the present invention relates to the use of zircon refractories to produce isopipes for use in a fusion process where the zircon refractory has a $TiO_2$ content greater than 0.2 wt. % and less than 0.4 wt. %.

Such a $TiO_2$ content causes the isopipe to exhibit reduced sag as a result of the refractory having a lower mean creep rate than zircon refractories currently used in the art. For example, the zircon refractory can have a mean creep rate at 1180° C. and 250 psi substantially less than $0.5 \times 10^{-6}$ inches/inches/hour.

In addition, such a $TiO_2$ content also causes the refractory to have a 95% confidence band (CB) for said mean creep rate (MCR) which is less than 50% of the mean creep rate, i.e., CB/MCR<0.5. Such a confidence band reduces the chances that the zircon refractory of a particular isopipe will have an abnormally high creep rate and thus cause the isopipe to have a short lifetime as a result of exhibiting unacceptable sag prematurely.

The $TiO_2$ content of a zircon refractory can be determined using various techniques known in the art. For example, the content can be determined by means of an X-ray fluorescence analysis (XRF). The titania content of the refractory can be adjusted so that the final product has the desired $TiO_2$ content by incorporating $TiO_2$ as needed in the batch materials used to prepare the refractory. Thereafter, the refractory can be prepared in accordance with techniques currently known in the art or with improved techniques which may be developed in the future.

Similarly, isopipes can be prepared from the zircon refractories of the invention using techniques currently known in the art or with improved techniques which may be developed in the future. Typically, the isopipe will be prepared by being machined from a single block of the zircon refractory, although other approaches can be used if desired.

Without intending to limit it in any manner, the present invention will be more fully described by the following examples.

Lots of zircon refractories containing 0.12 wt. % or 0.30 wt. % $TiO_2$ were obtained from Corhart Refractories Corporation (Louisville, Ky.). Each lot represented a separate firing and typically included multiple blocks of material of suitable dimensions to produce an isopipe, i.e., the blocks had lengths greater than 1.5 meters.

Creep rate tests were performed on 117 specimens taken from blocks having 0.12 wt. % $TiO_2$ and 142 specimens taken from blocks having 0.30 wt. % $TiO_2$. A three point flexure technique was used to determine creep rates in which a bar of the material being tested was supported at its ends and loaded at its center. The applied stress in pounds per square inch (psi) was determined in accordance with conventional procedures as set forth in ASTM C-158. In particular, applied stress σ was determined from the relation:

$$\sigma = 3 \cdot AL \cdot SS / (2 \cdot SW \cdot SH^2)$$

where AL=applied load, SS=support span, SW=specimen width, and SH=specimen height.

The bar was heated and its flexure as a function of time was measured. A midspan deflection rate was obtained by calculating the slope of the resulting deflection versus time plot once steady state conditions for the particular load and temperature had been reached. In particular, the midspan deflection rate was determined for the "secondary creep" portion of the strain versus time curve. See, for example, the Kingery et al. text cited above at pages 707-709.

Creep rates ε were then obtained from the relation:

$$\epsilon = DR \cdot 2 \cdot SH / SS^2$$

where SH and SS are as defined above and DR=midspan deflection rate.

Figure 2A:
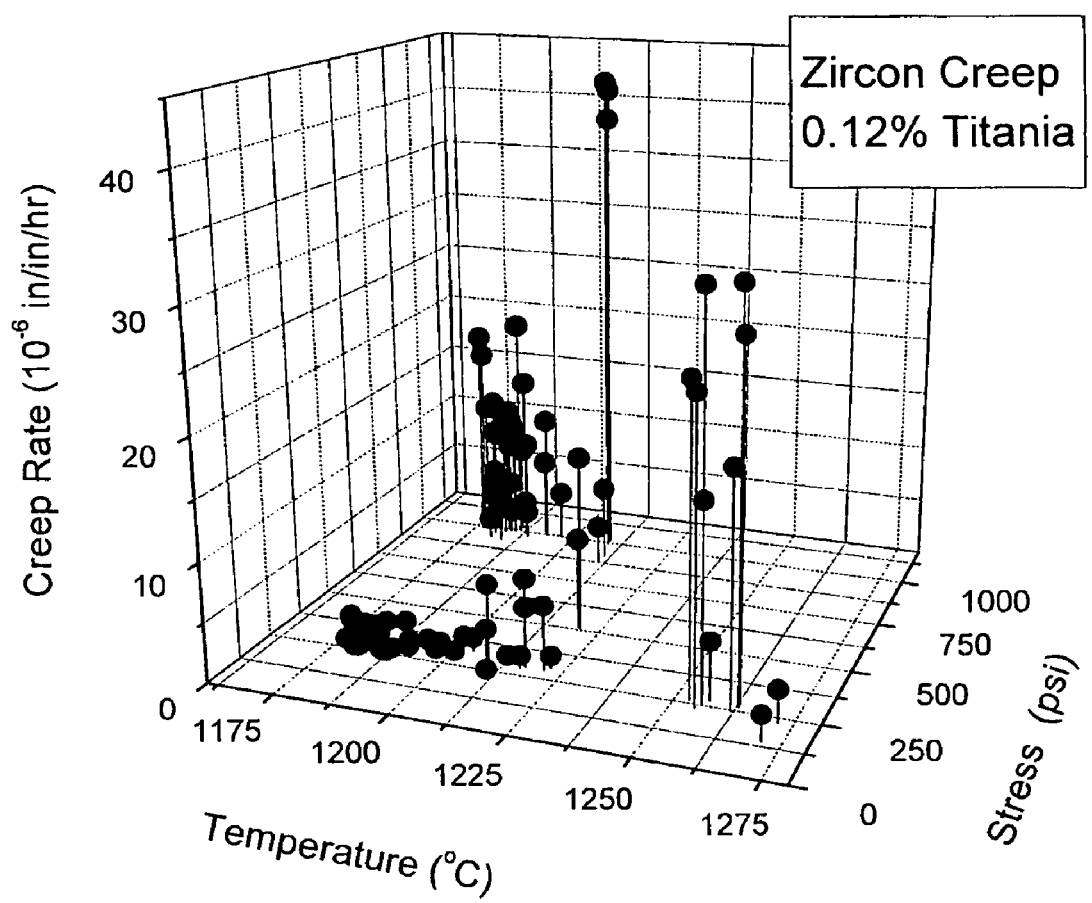
FIGS. 2A and 2B are three dimensional plots showing experimentally measured creep rate as a function of temperature and stress for zircon specimens having $TiO_2$ concentrations of 0.12 wt. % and 0.30 wt. %, respectively.
Figure 2B:
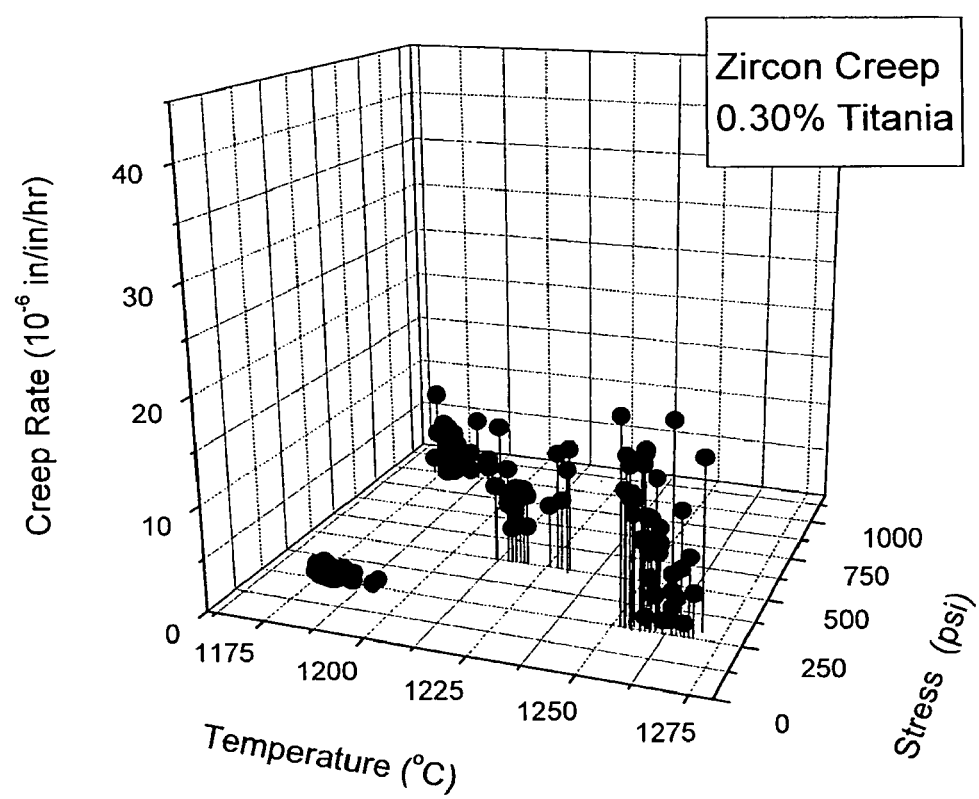

FIG. 2A and FIG. 2B are three dimensional plots of the creep rate values obtained in this way for the 0.12 wt. % $TiO_2$ and 0.30 wt. % $TiO_2$ specimens, respectively. The reduction in the scatter of the data achieved by the change in $TiO_2$ concentration is immediately evident from these figures. In terms of producing isopipes which will have repeatable creep properties, the data of these figures show that a zircon refractory having a $TiO_2$ content of around 0.3 wt. % is clearly much better than one having a $TiO_2$ content around 0.1 wt. %.

The power law model of equation (1) was fit to the data of FIG. 2A and to that of FIG. 2B using a commercial data analysis package, namely, "TableCurve 3D: Automated Surface Fitting and Equation Discovery," Version 3.0 for Windows® 95 & NT, software and documentation, SPSS Inc., Chicago, 1997 (hereinafter the "TABLE CURVE 3D program"). The values of the material dependent constants A, n, and Q obtained in this way for the two cases are set forth in Table 1.

Figure 3A:
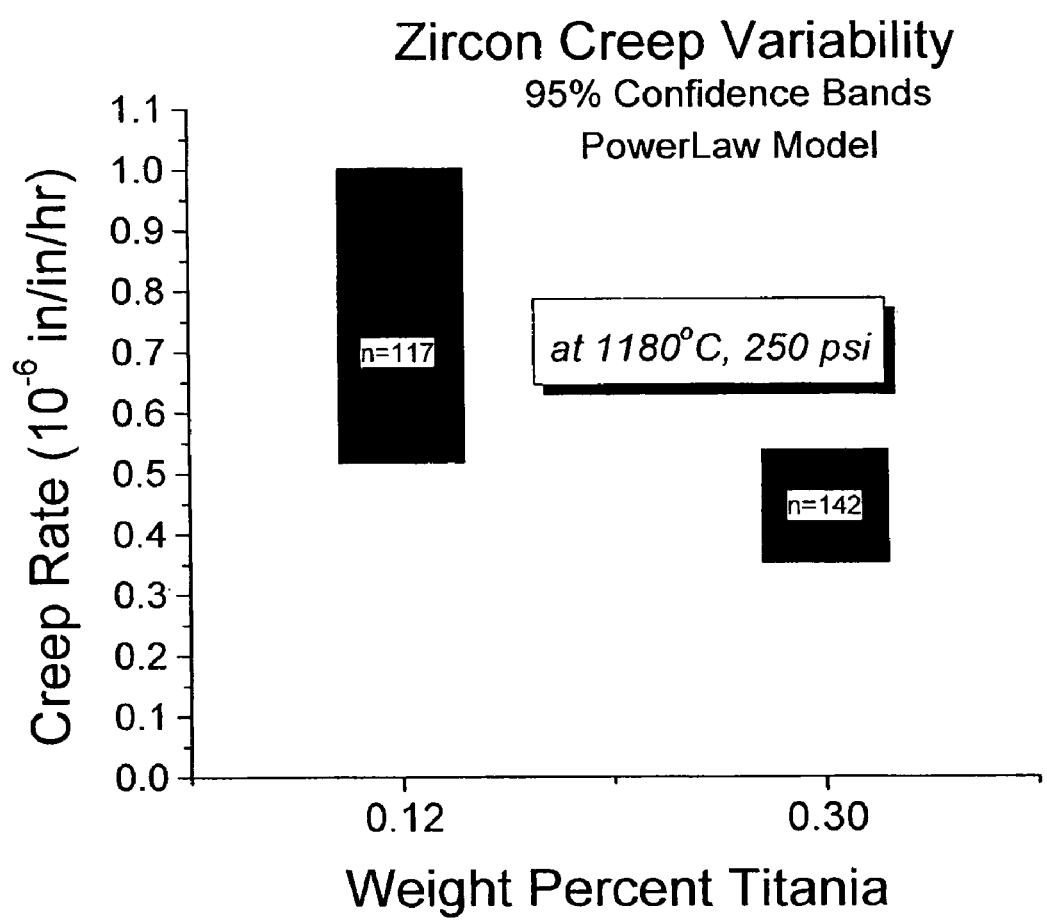
FIGS. 3A and 3B are plots illustrating the differences in creep rate variability at a temperature of 1180° C. for 0.12 wt. % $TiO_2$ versus 0.30 wt. % $TiO_2$ for applied stresses of 250 psi and 1000 psi, respectively.

Using these constants and the TABLE CURVE 3D program, mean creep rates and 95% confidence bands were determined for a temperature of 1180° C. and a stress of 250 psi, which are representative of the temperatures and stress levels which an isopipe will typically experience during use. The results of this analysis are shown in FIG. 3A.

Two important facts are evident from this figure. First, the mean creep rate has been substantially reduced as a result of the increase in $TiO_2$ content from 0.12 wt. % to 0.30 wt. %. This means that isopipes composed of zircon refractories having higher $TiO_2$ than previously used will exhibit less sag during use, a highly desirable result. Moreover, the size of the 95% confidence band has also been substantially reduced by the increase in $TiO_2$ content. This means that an individual isopipe made from an individual block of a zircon refractory is more likely to have its creep rate closer to the predicted mean creep rate when the $TiO_2$ content of the material is increased than when it is not increased, another highly desirable result since predictability in a manufacturing setting makes for more efficient planning and operation.

Figure 3B:
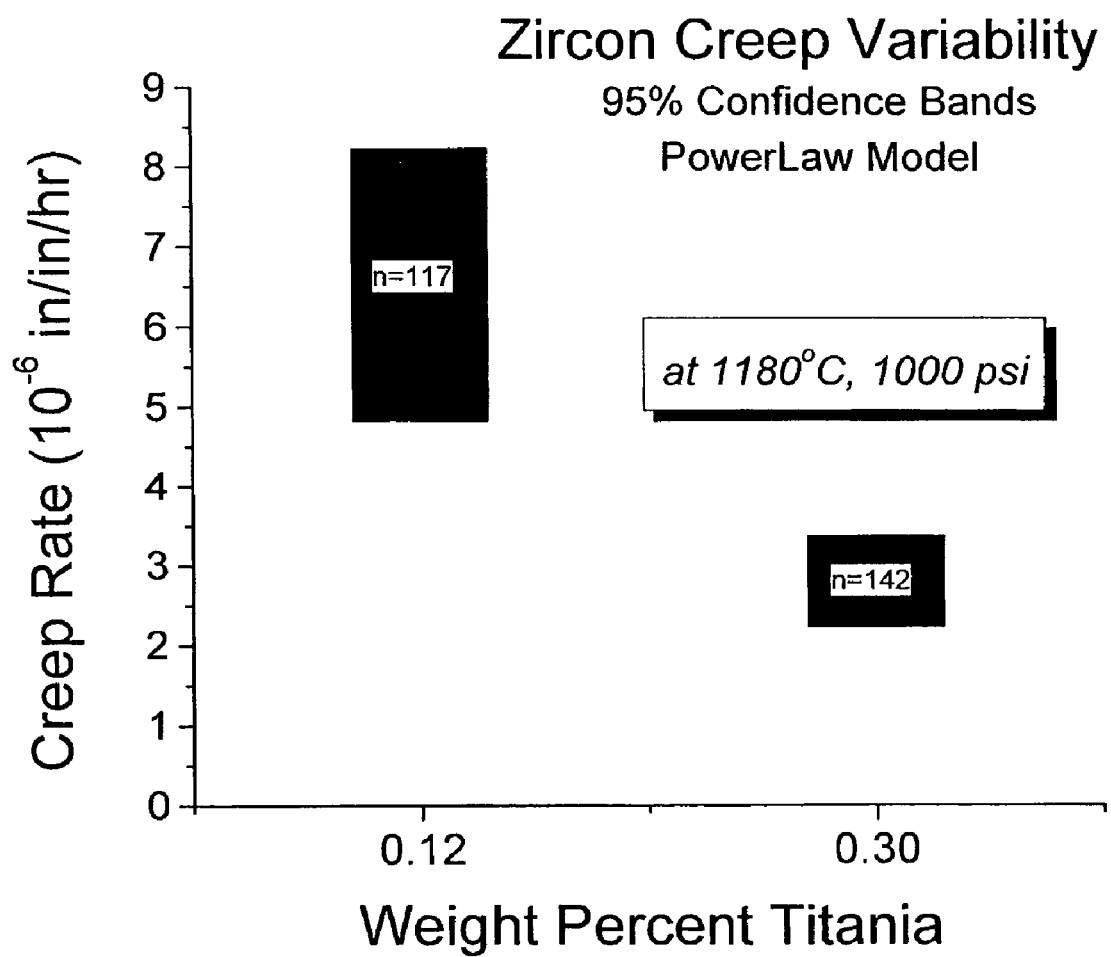

To further demonstrate the controlling effect which $TiO_2$ content has on creep rate, mean creep rates and 95% confidence bands were also determined for a stress of 1000 psi, again using the constants of Table 1 and the TABLE CURVE 3D program. The results are shown in FIG. 3B. The reduction in mean creep rate achieved by increasing the $TiO_2$ content is even greater at this higher stress level.

Table 2 summarizes the results of using the TABLE CURVE 3D program to determine mean creep rates and 95% confidence bands for the data of FIG. 2. Zircon refractories having a $TiO_2$ content above and below the 0.3 wt. % value used to generate this data will exhibit similar MCR and CB values to those shown in Table 2. In particular, reduced MCR and CB/MCR values compared to previously used zircon refractories are achieved when the $TiO_2$ content of the refractory is greater than 0.2 wt. %. The improved performance continues as the $TiO_2$ content is increased above 0.3 wt. %. However, oxygen blisters can be generated at the isopipe/glass interface when the $TiO_2$ content of the zircon refractory reaches about 0.4 wt. %. Thus, in accordance with the invention, the $TiO_2$ content of the refractory should be above 0.2 wt. % but below 0.4 wt. %.

Although specific embodiments of the invention have been discussed, a variety of modifications to those embodiments which do not depart from the scope and spirit of the invention will be evident to persons of ordinary skill in the art from the disclosure herein. The following claims are intended to cover the specific embodiments set forth herein as well as such modifications, variations, and equivalents.

TABLE 1

| $TiO_2$ (wt. %) | A | n | Q |
| --- | --- | --- | --- |
| 0.12 | $1.04 \times 10^{12}$ | 1.56 | −73302 |
| 0.30 | $1.20 \times 10^{14}$ | 1.33 | −79038 |

TABLE 2

| Example | $TiO_2$ (wt. %) | T (° C.) | σ (psi) | MCR ($10^{-6}$ in/in/hr) | CB ($10^{-6}$ in/in/hr) | CB/MCR |
| --- | --- | --- | --- | --- | --- | --- |
| 1 | 0.12 | 1180 | 250 | 0.7197 | 0.5163 to 1.003 | 0.6763 |
| 2 | 0.30 | 1180 | 250 | 0.4340 | 0.3500 to 0.5390 | 0.4355 |
| 3 | 0.12 | 1180 | 1000 | 6.296 | 4.811 to 8.240 | 0.5446 |
| 4 | 0.30 | 1180 | 1000 | 2.730 | 2.210 to 3.380 | 0.4286 |

MCR = mean creep rate
CB = 95% confidence band for the MCR

What is claimed is:

1. A method for reducing sag of an isopipe used in a fusion process that produces glass sheets comprising forming said isopipe from a zircon refractory which comprises $TiO_2$ and has the following properties:
   (i) a mean creep rate at 1180° C. and 250 psi of less than $0.7 \times 10^{-6}$ inches/inches/hour; and
   (ii) a mean creep rate at 1800° C. and 1000 psi of less than $3 \times 10^{-6}$ inches/inches/hour;
where the mean creep rates are determined using a power law model.

2. The method of claim 1 wherein the zircon refractory also has the following properties:
   (a) a 95 percent confidence band to mean creep rate ratio of less than 0.5 at 1180° C. and 250 psi; and
   (b) a 95 percent confidence band to mean creep rate ratio of less than 0.5 at 1800° C. and 1000 psi;
where the mean creep rates and the 95 percent confidence bands are determined using a power law model.

3. A method of making an isopipe which has a configuration adapted for use in a fusion process comprising:
   (a) selecting a zircon refractory which comprises $TiO_2$ and has the following properties:
      (i) a mean creep rate at 1180° C. and 250 psi of less than $0.7 \times 10^{-6}$ inches/inches/hour; and
      (ii) a mean creep rate at 1180° C. and 1000 psi of less than $3 \times 10^{-6}$ inches/inches/hour;
   where the mean creep rates are determined using a power law model;
   (b) providing a single block of the selected zircon refractory of a sufficient size to produce the isopipe; and
   (c) forming the isopipe from said block.

4. The method of claim 3 wherein the zircon refractory also has the following properties:
   (a) a 95 percent confidence band to mean creep rate ratio of less than 0.5 at 1180° C. and 250 psi; and
   (b) a 95 percent confidence band to mean creep rate ratio of less than 0.5 at 1180° C. and 1000 psi;
where the mean creep rates and the 95 percent confidence bands are determined using a power law model.

5. The method of claim 3 wherein forming the isopipe comprises machining the block.

6. The method of claim 3 wherein the block has a length greater than 1.5 meters.

7. An isopipe comprising a body having a configuration adapted for use in a fusion process said body comprising a zircon refractory which comprises $TiO_2$ and has the following properties:
   (i) a mean creep rate at 1180° C. and 250 psi of less than $0.7 \times 10^{-6}$ inches/inches/hour; and
   (ii) a mean creep rate at 1180° C. and 1000 psi of less than $3 \times 10^{-6}$ inches/inches/hour;

where the mean creep rates are determined using a power law model.

8. The isopipe of claim 7 wherein the zircon refractory also has the following properties:
   (a) a 95 percent confidence band to mean creep rate ratio of less than 0.5 at 1180° C. and 250 psi; and
   (b) a 95 percent confidence band to mean creep rate ratio of less than 0.5 at 1800° C. and 1000 psi;

where the mean creep rates and the 95 percent confidence bands are determined using a power law model.

9. A refractory block suitable for producing the isopipe of claim 7, said block having a length greater than 1.5 meters and comprising a zircon refractory which comprises $TiO_2$ and has the following properties: (i) a mean creep rate at 1180° C. and 250 psi of less than $0.7 \times 10^{-6}$ inches/inches/hour, and (ii) a mean creep rate at 1180° C. and 1000 psi of less than $3 \times 10^{-6}$ inches/inches/hour, where the mean creep rates are determined using a power law model.

10. The refractory block of claim 9 wherein the zircon refractory also has the following properties: a 95 percent confidence band to mean creep rate ratio of less than 0.5 at 1180° C. and 250 psi, and a 95 percent confidence band to mean creep rate ratio of less than 0.5 at 1180° C. and 1000 psi, where the mean creep rates and the 95 percent confidence bands are determined using a power law model.

* * * * *